United States Patent
Matsumura et al.

(10) Patent No.: US 6,769,298 B2
(45) Date of Patent: Aug. 3, 2004

(54) GAS FLOW RATE MEASURING DEVICE HAVING AN INTEGRATED CHIP TEMPERATURE SENSOR AND ADJUSTMENT PROCESSING CIRCUIT ON COMMON CHIP

(75) Inventors: Takafumi Matsumura, Hitachinaka (JP); Kenichi Katagishi, Hitachinaka (JP); Masahiro Matsumoto, Hitachi (JP); Keiji Hanzawa, Mito (JP)

(73) Assignees: Hitachi, Ltd., Tokyo (JP); Hitachi Car Engineering Co., Ltd., Ibaraki (JP)

(*) Notice: Subject to any disclaimer, the term of this patent is extended or adjusted under 35 U.S.C. 154(b) by 76 days.

(21) Appl. No.: 10/124,370

(22) Filed: Apr. 18, 2002

(65) Prior Publication Data

US 2003/0101809 A1 Jun. 5, 2003

(30) Foreign Application Priority Data

Dec. 4, 2001 (JP) .................... 2001-370023

(51) Int. Cl.⁷ .............................. G01F 1/68
(52) U.S. Cl. .................... 73/204.15; 702/57
(58) Field of Search .............. 73/204.26, 204.22, 73/204.25, 204.15; 702/57, 64, 65, 45, 46, 50

(56) References Cited

U.S. PATENT DOCUMENTS

| | | | | |
|---|---|---|---|---|
| 5,187,674 A | * | 2/1993 | Bonne | ............ 702/50 |
| 5,301,126 A | * | 4/1994 | Nishimura et al. | ............ 702/45 |
| 5,379,230 A | * | 1/1995 | Morikawa et al. | ............ 702/57 |
| 5,440,924 A | * | 8/1995 | Itsuji et al. | ............ 73/204.25 |
| 5,805,403 A | * | 9/1998 | Chemla | ............ 361/103 |
| 6,311,136 B1 | * | 10/2001 | Henry et al. | ............ 702/45 |
| 6,504,489 B1 | * | 1/2003 | Westfield et al. | ............ 340/870.3 |

FOREIGN PATENT DOCUMENTS

| | | |
|---|---|---|
| JP | 60-100218 | 6/1985 |
| JP | 5-157602 | 6/1993 |
| JP | 6-207842 | 7/1994 |
| JP | 8-278178 | 10/1996 |
| JP | 11-118552 | 4/1999 |
| JP | 3073089 | 6/2000 |
| JP | 2000-338193 | 12/2000 |

* cited by examiner

*Primary Examiner*—Edward Lefkowitz
*Assistant Examiner*—Corey D. Mack
(74) *Attorney, Agent, or Firm*—Crowell & Moring LLP

(57) ABSTRACT

A flow rate signal analog-digital conversion circuit 30, an adjustment processing circuit 40 and a chip temperature sensor circuit 60 are disposed a single semiconductor chip 100 to form an integrated circuit, and a chip temperature signal in a form of digital signal outputted from the chip temperature sensor circuit 60 is inputted into the adjustment processing circuit 40 in which correction reducing temperature dependent error in a series of signal processing circuits is performed. Thereby, a board temperature dependent error in a gas flow rate measuring device can be reduced in which adjustment is performed for digital signals.

36 Claims, 7 Drawing Sheets

GAS FLOW RATE MEASURING DEVICE HAVING AN INTEGRATED CHIP TEMPERATURE SENSOR AND ADJUSTMENT PROCESSING CIRCUIT ON COMMON CHIP

BACKGROUND OF THE INVENTION

1. Field of the Invention

The present invention relates to a gas flow rate measuring device, in other words a gas flow meter.

2. Conventional Art

In order to control fuel supply to an internal combustion engine, it is necessary to grasp intake gas flow rate into the internal combustion engine, therefore, a gas flow rate measuring device which measures air flow rate in an intake air passage is disposed therein.

This gas flow rate measuring device is constituted by a bridge circuit including a heating resistor (also called as a hot wire), a gas temperature measuring resistor (also called as a cold wire) and two resistors having respective constant resistances and current supply to the bridge circuit is controlled to maintain the resistance balance of the bridge circuit so as to keep always the temperature of the heat resistor constant. With this structure, in response to an increase of the intake air flow rate in the air intake passage heat radiation amount from the heating resistor increases, thus the amount of current to be supplied for keeping the temperature of the heating resistor increases, thereby, the air flow rate can be measured based on a voltage appearing across the constant resistance resistor connected in series with the heating resistor. Then, if the voltage is processed by an adjustment processing circuit having a predetermined characteristic which shows a required air flow rate versus output signal characteristic, a flow rate signal having a predetermined relationship with the air flow rate can be outputted from the adjustment processing circuit.

Presently, analog signal processing circuits are primarily used for the adjustment processing circuit, however, if a digital signal processing circuit is used therefor, a highly accurate adjustment can be realized. Japanese patent No. 3073089 (which corresponds to JP-A-5-223611 (1993)) discloses an adjustment processing circuit in which the adjustment is performed by a digital signal processing circuit. More specifically, after converting a flow rate signal in a form of analog signal into a signal in a form of digital signal by an analog-digital conversion circuit, the adjustment processing circuit performs adjustment of zero point and span range through computing processing by a digital processing circuit, then the signal in a form of digital signal is converted into a flow rate signal in a form of analog signal by a digital-analog conversion circuit, thereafter, the flow rate signal in a form of analog signal corresponding to the desired gas flow rate is outputted. An adjustment coefficient necessary for executing the adjustment processing in the digital processing circuit is preserved in a memory device such as PROM. Further, with a digital processing circuit, since non-linear processing can be easily performed, when performing adjustment for an output, the adjustment of zero point and span range as well as non-linear adjustment can be easily realized. Through such non-linear adjustment the adjustment accuracy can be kept below ±2%.

Further, JP-A-11-118552 (1999) discloses an adjustment processing circuit in which, in order to perform adjustment in a form of digital signal an over sampling type analog-digital conversion circuit including a sigma delta modulator is used for an analog-digital conversion circuit, thereby, reduction in circuit scale thereof can be realized.

Still further, JP-A-2000-338193 discloses a digital processing circuit in which in order to perform adjustment in a form of digital signal an adjustment coefficient necessary for performing adjustment processing is written in a memory element such as PROM via a terminal of a digital input and output circuit for performing communication with outside of a sensor, and which proposes to use a 3rd degree polynomial for the adjustment processing.

Now, it is desirable that an error in output characteristic of a gas flow rate measurement device is small even when temperature varies, namely, temperature dependent error thereof is small. The temperature dependent error primarily includes two types of error, one is an intake air temperature dependent error which is caused when gas temperature varies under a constant circuit board temperature and the other is a circuit board temperature dependent error (also called as a module temperature dependent error) which is caused when the circuit board temperature varies under a constant gas temperature.

With regard to the intake air temperature dependent error, an output voltage V1 of a gas flow rate detection circuit is expressed by the following King's equation defining a predetermined curve;

$$V1 = (A + B \cdot Q^{1/2})^{1/2} \tag{1}$$

wherein Q is a flow rate and A and B are constants and are functions of temperature, because these are ones containing thermal conductivity and kinetic viscosity of air, and inherently contain an intake air temperature dependent error.

For example, JP-A-8-278178 (1996) discloses a gas flow rate measurement device for decreasing the above intake air temperature dependent error in which a circuit is constituted so that the dependency of measurement error by temperature variation with respect to air flow rate is corrected by designing a temperature characteristic of a reference voltage generating circuit in the gas flow rate measuring device to have flow rate dependency which cancels out the measurement error.

Further, in the above referred to Japanese Patent No. 3073089, a flow rate signal in a form of analog signal outputted from the gas flow rate detection circuit is converted into a digital signal and intake air temperature is measured, then the digital flow rate signal is corrected from the measured intake air temperature by making use of a lookup table, thereby, the intake air temperature dependent error is reduced.

On the other hand, several adjusting methods of the board temperature characteristic have been proposed.

For example, JP-A-60-100218 (1985) proposes to constitute a reference voltage circuit for a zero span adjusting circuit constituted by a zener diode, a diode, an operational amplifier and a resistor and in which a temperature characteristic of the reference voltage is determined by adjusting in advance the value of current flowing through the zener diode by means of trimming the resistor, thereby, through properly setting the temperature characteristic of the reference voltage circuit, the board temperature dependent error is reduced substantially zero.

Further, JP-A-5-157602 (1993) discloses a use of a band gap voltage source circuit for the reference voltage circuit to thereby further decrease the board temperature dependent error.

Still further, JP-A-6-207842 (1994) proposes to operate a gas flow rate measuring device under a most preferable board temperature characteristic by setting the in-chips temperature at substantially constant to thereby reduce the error.

However, with the adjustment method in a form of digital signal which permits a highly accurate adjustment, since the flow rate signal is either digital-converted or analog-converted by making use of a reference voltage source as a reference voltage in both analog-digital conversion circuit and digital-analog conversion circuit, when the board temperature varies because of the temperature dependency of the reference voltage source, no negligible conversion error is caused during the analog-digital conversion and the digital-analog conversion.

Further, with the measure disclosed in JP-A-6-207842 (1994), it is difficult to keep the chip temperature accurately at a constant value, in addition since it takes time to raise the chip temperature such as immediately after making the power source, the board temperature dependent error during such interval can not be reduced.

SUMMARY OF THE INVENTION

An object of the present invention is to provide a gas flow rate measuring device which can reduce a temperature dependent error through adjustment in a form of digital signal.

Another object of the present invention is to provide a small sized gas flow rate measuring device which can reduce a temperature dependent error through adjustment in a form of digital signal.

Still another object of the present invention is to provide a small sized and easy manufacturable gas flow rate measuring device which can reduce a temperature dependent error through adjustment in a form of digital signal.

A gas flow rate measuring device according to the present invention which comprises a gas flow rate detection circuit which detects such as current flowing through a resistor disposed in a gas flow passage and voltage induced across the resistor dependent on the current flowing therethrough and outputs a flow rate signal in a form of analog signal in response to the gas flow rate flowing through the gas flow passage; a flow rate signal analog-digital conversion circuit which converts the flow rate signal in a form of analog signal outputted from the gas flow rate detection circuit into an electric signal in a form of digital signal; and an adjustment processing circuit which adjusts the flow rate signal in a form of digital signal so as to assume a desired output characteristic, is characterized in that the flow rate signal analog-digital conversion circuit and the adjustment processing circuit are integrated on a common semiconductor chip as well as a chip temperature sensor and a chip temperature signal analog-digital conversion circuit are also integrated on the common semiconductor chip, a chip temperature signal in a form of analog signal outputted from the chip temperature sensor is converted into a chip temperature signal in a form of digital signal by the chip temperature signal analog-digital conversion circuit and the converted digital chip temperature signal is inputted into the adjustment processing circuit so as to perform correction for reducing a temperature dependent error in a series of signal processing circuits.

DETAILED DESCRIPTION OF THE PREFERRED EMBODIMENTS

Embodiments of gas flow rate measuring devices according to the present invention will be explained with reference to drawings.

First Embodiment

Figure 1:
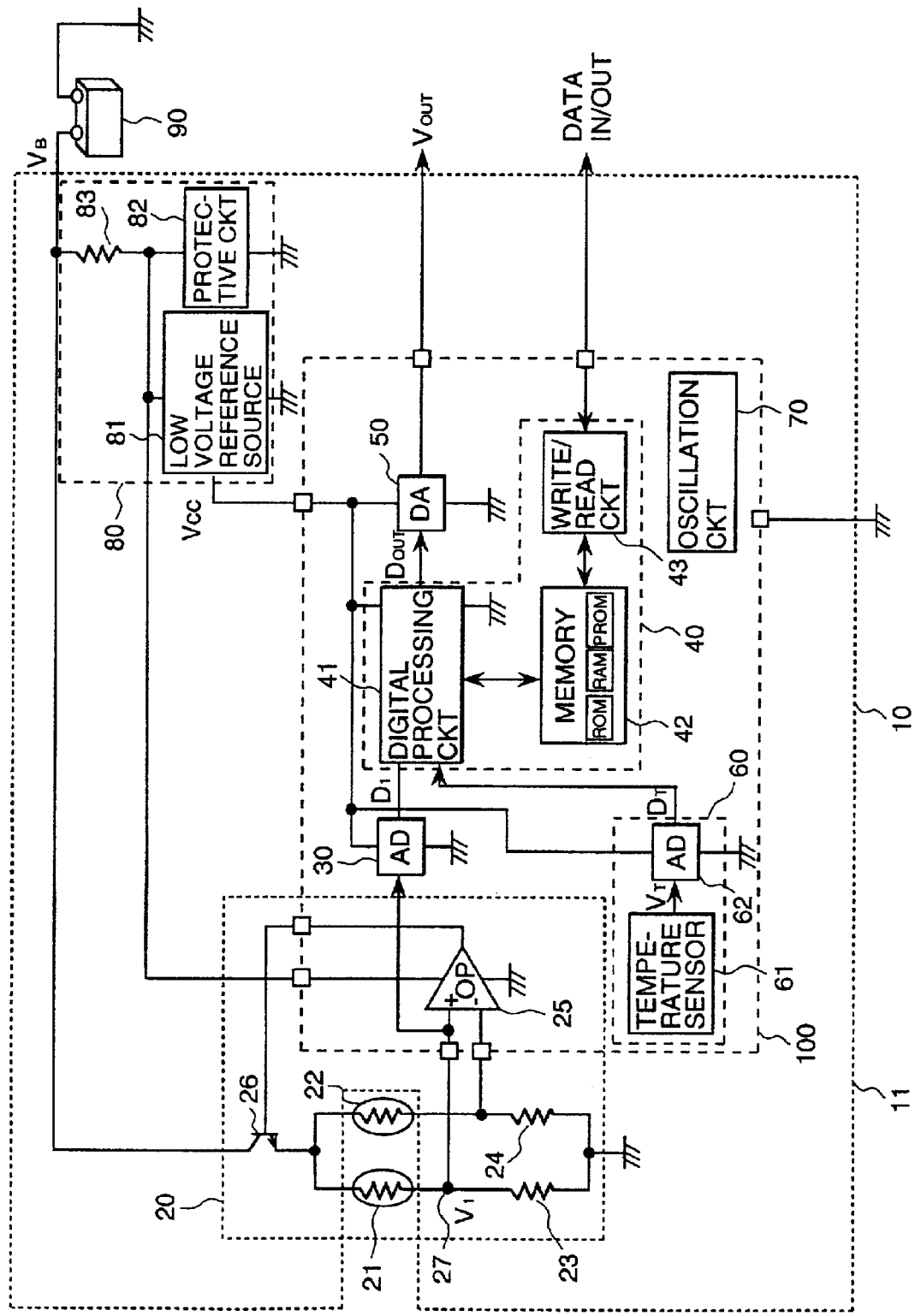
FIG. 1 is a block diagram showing a circuit structure of a gas flow rate measuring device representing a first embodiment of the present invention.
Figure 2:
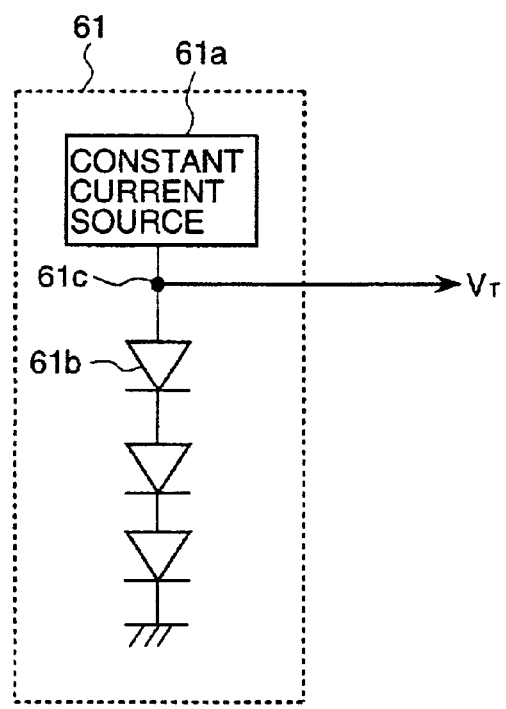
FIG. 2 is a circuit diagram of a chip temperature sensor circuit in the gas flow rate measuring device as shown in FIG. 1.
Figure 3:
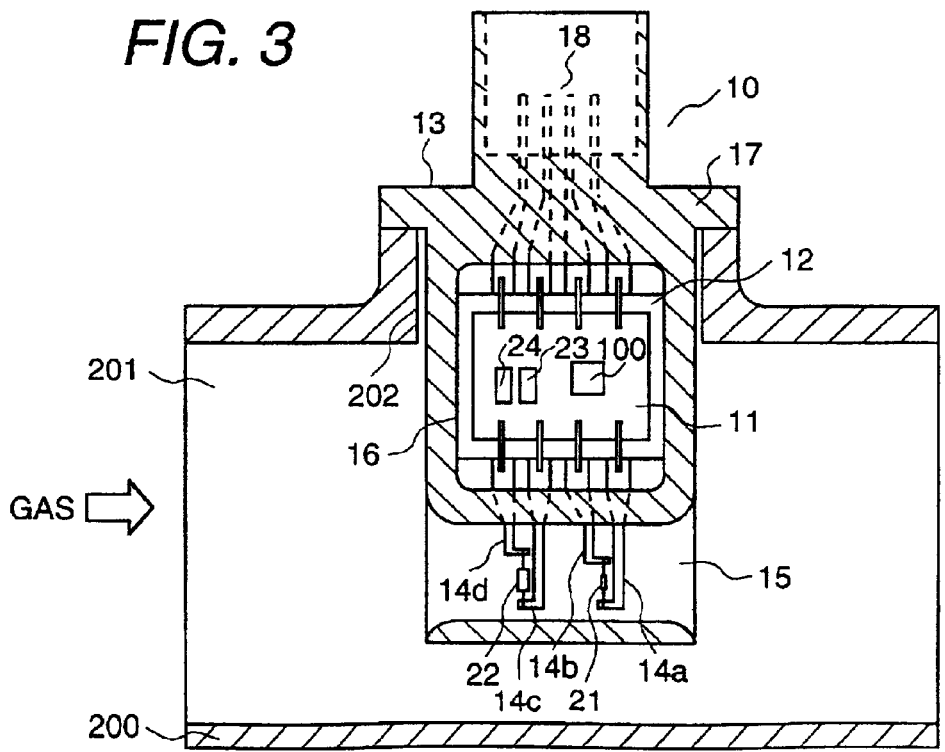
FIG. 3 is a vertical cross sectional side view showing a state in which the gas flow rate measuring device as shown in FIG. 1 is mounted on a gas flow passage body.
Figure 4:
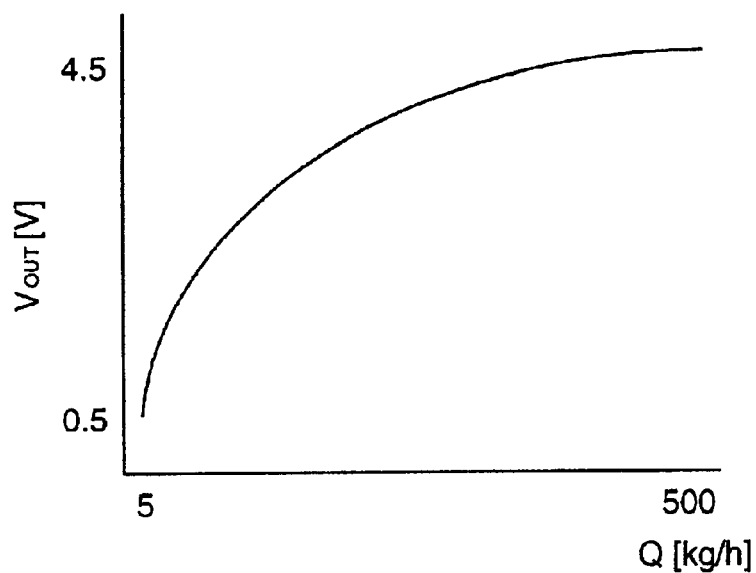
FIG. 4 is a diagram showing an example of flow rate signal output characteristic (air flow rate versus output voltage characteristic) of the gas flow rate measuring device as shown in FIG. 1.

FIG. 1 is a block diagram showing a circuit structure of a gas flow rate measuring device according to the present embodiment, FIG. 2 is a circuit diagram of a chip temperature sensor circuit, FIG. 3 is a vertical cross sectional side view showing a state in which the gas flow rate measuring device is mounted on a gas flow passage body forming an intake air passage for an internal combustion engine and FIG. 4 is a diagram showing an example of a flow rate signal output characteristic.

In FIG. 1, a gas flow rate measuring device 10 is provided with a gas flow rate detection circuit 20, a flow rate signal analog-digital conversion circuit 30, an adjustment processing circuit 40, a flow rate signal pulse output conversion circuit 50, a chip temperature sensor circuit 60, a clock signal generating circuit 70 and a power source circuit 80, and is fed from a battery 90 to perform a gas flow rate measurement.

The gas flow rate detection circuit 20 constitutes a bridge circuit formed by a heating resistor (also called as a hot wire) 21 disposed in an intake air passage, a gas temperature measurement use resistor (also called as a cold wire) 22 and two constant resistance resistors 23 and 24, and a current supply control to the thus constituted gas flow rate detection circuit which keeps the temperature of the heating resistor 21 constant is performed by controlling a power transistor 26 so as to balance the bridge circuit through detecting the balancing state of the bridge circuit with an operational amplifier 25. When performing such current supply control for the bridge circuit, a DC voltage (flow rate signal in a form of analog signal) V1 having a magnitude corresponding to gas flow rate Q as indicated in equation (1) above is induced at a series connection terminal 27 of the heating resistor 21 and the constant resistance resistor 23.

The flow rate signal analog-digital conversion circuit 30 is inputted of a flow rate signal in a form of analog signal from the terminal 27 of the gas flow rate detection circuit 20, converts the same into a flow rate signal D1 in a form of digital signal and outputs the same.

The adjustment processing circuit 40 is provided with a digital processing circuit 41 such as a CPU, a memory unit 42 including read/write free memory (RAM), a read only memory (ROM) and a recordable memory (such as EPROM and EEPROM) and a read/write circuit 43 which records an adjustment coefficient into the memory unit 42, performs an output characteristic adjustment of the flow rate signal in a form of digital signal and an adjustment processing for correcting a temperature dependent error and outputs the adjusted flow rate signal Dout in a form of digital signal.

The flow rate signal pulse output conversion circuit 50 converts the flow rate signal Dout in a form of digital signal outputted from the adjustment processing circuit 40 into a flow rate signal Vout in a form of analog signal and outputs the same.

The chip temperature sensor circuit 60 is a circuit which obtains temperature information for correcting a temperature dependent error in a series of signal processing circuits including the power source circuit 80 and is provided with a chip temperature sensor 61 and a chip temperature signal analog-digital conversion circuit 62. The chip temperature sensor 61 is, for example, constituted by connecting a constant current source 61a and a plurality of diodes 61b in series as shown in FIG. 2 so as to obtain a chip temperature signal $V_T$ in a form of analog signal from a connection terminal 61c between the constant current source 61a and the diode 61b. In this structure, a voltage output with respect to temperature variation varies in a rate of about $-2 \times n$(mV/° C.), wherein n is number of diodes 61b, and the structure shows a desirable linearly. The chip temperature signal analog-digital conversion circuit 62 converts the chip temperature signal $V_T$ in a form of analog signal outputted from the chip temperature sensor 61 into the chip temperature signal $D_T$ in a form of digital signal and outputs the same to the digital processing circuit 41 in the adjustment processing circuit 40.

The clock signal generating circuit 70 generates clock signals for operating the flow rate signal analog-digital conversion circuit 30, the adjustment processing circuit 40 and the chip temperature analog-digital conversion circuit 62.

The power source circuit 80 is provided with a constant voltage reference power source circuit 81, a protection circuit 82 and a current limiting resistor 83. The constant voltage reference power source circuit 81 drives the analog-digital conversion circuits 30 and 62, the digital processing circuit 41 and the flow rate signal pulse output conversion circuit 50, and produces a power source voltage Vcc (primarily 5V) serving as a reference voltage for the analog-digital conversion circuits 30 and 62 and the flow rate signal pulse output conversion circuit 50. The protection circuit 82 suppresses such as surges, overvoltages and high frequency noises to enter into the series of signal processing routes. The current limiting resistor 83 prevents an excess current flowing into the protection circuit 82.

An electronic circuit of such gas flow rate measuring device 10 is implemented on a hybrid IC board 11 except for the heating resistor 21 and the gas temperature measurement use resistor 22 which are required to be exposed to the gas to be measured. Moreover, the operational amplifier 25 in the gas flow rate detection circuit 20, the flow rate signal analog-digital conversion circuit 30, the adjustment processing circuit 40, the flow rate signal pulse output conversion circuit 50, the chip temperature sensor circuit 60 and the clock signal generation circuit 70 are constituted and implemented on a common semiconductor chip 100 to form an integrated circuit by making use of semiconductor integrated circuit technology. Further, although the constant resistance resistors 23 and 24 in the gas flow rate detection circuit 20 can be integrated on the common semiconductor chip 100, however, current flowing through these constant resistance resistors 23 and 24 is large and the respective resistors have to be formed accurately to show respective desired resistances and further, the temperature coefficient (TCR) of the respective resistances are required to be kept small, thick film resistors formed on the hybrid IC board 11 are used in the present embodiment.

The hybrid IC board 11 is adhered and attached on a base 12 having a good thermal conductivity such as aluminum as shown in FIG. 3 and further the same is attached on a casing 13 made by resin molding.

The casing 13 is attached to a gas flow passage body 200 forming the intake air passage 201 for the internal combustion engine in such a manner that the heating resistor 21 and the gas temperature measurement use resistor 22 in the gas flow rate detection circuit 20 and the base 12 are exposed to the gas flowing through the intake air passage 201. For this reason, the casing 13 is provided with an auxiliary flow passage portion or a bypass passage 15 which accommodates the heating resistor 21 and the gas temperature measurement use resistor 22 connected and supported by electrode rods 14a through 14d projecting therein, a board receiving chamber portion 16 which receives the hybrid IC board 11 attached on the base 12, an attachment flange 17 and a connection terminal portion 18, and the auxiliary flow passage portion 15 and the board receiving chamber portion 16 are inserted through an attachment window 202 formed at the side wall of the gas flow passage body 200 to locate and project the same into the intake air flow passage 201 and the flange 17 is secured to the gas flow passage body 200 by screws. With such arrangement structure, a part of the gas flowing into the intake air flow passage 201 flows into the auxiliary flow passage 15. The electrode rods 14a through 14d are connected to the hybrid IC board 11 and the hybrid IC board 11 is connected to a connection cable (not shown) from an external unit via the connection terminal portion 18.

Thus constituted gas flow rate measuring device 10 performs heating current control through control of the power transistor 26 with the operational amplifier 25 so that the bridge circuit constituted by the resistors 21 through 24 assumes a balanced state. Although the temperature of the heating resistor 21 rises due to heating by the heating current to increase resistance thereof, however, the temperature thereof lowers due to heat radiation to the gas flowing through the auxiliary flow passage 15 to decreases resistance thereof. Herein, because of the balancing action of the bridge circuit, since the resistance of the heating resistor 21 is kept substantially constant, therefore, when the flow rate of the gas flowing through the auxiliary flow passage 15 increases, the heat radiation amount from the heating resistor 21 increases and the heating current flowing through the heating resistor 21 increases. Thereby, the voltage V1 expressed by equation (1) which corresponds to the flow rate Q of the gas flowing through the intake air passage 201 appears across the constant resistance resistor 23.

The flow rate signal analog-digital conversion circuit 30 is inputted of the flow rate signal of the voltage V1 in a form of analog signal from the series connection terminal 27 of the heating resistor 21 and the constant resistance resistor 23, converts the same into the flow rate signal D1 in a form of digital signal and outputs the same.

Further, the chip temperature sensor circuit 60 generates the chip temperature signal $V_T$ in a form of analog signal corresponding to the temperature of the semiconductor chip 100 by the chip temperature sensor 61, converts the same into the chip temperature signal $D_T$ in a form of digital signal by the chip temperature signal analog-digital conversion circuit 62 and outputs the same.

The digital processing circuit 41 in the adjustment processing circuit 40 is inputted of the flow rate signal D1 and the chip temperature signal $D_T$ and, through execution of a predetermined program stored in the memory unit 42, performs zero point and span range adjustment and correction for reducing the temperature dependent error in the series of signal processing units including the flow rate signal analog-digital conversion circuit 30, the flow rate signal pulse output conversion circuit 50 and the chip temperature signal analog-digital conversion circuit 62 according to the following equation, and the flow rate signal Dout in a form of digital signal subjected to the correction for reducing the temperature dependent error is outputted.

$$Dout=f(D1, D_T) \quad (2)$$

Further, the zero point, the span range and the adjustment coefficient (constant) of the temperature dependent error for processing f above are written in the memory unit 42 via the read/write circuit 43 from an external unit at the time of output characteristic adjustment of the gas flow rate measuring device 10 and is stored therein. Since the digital processing circuit 41 performs computation of a linear equation for the zero point and span range as well as can easily perform computation of any non-linear equations, a non-linear adjustment can be easily performed at the time of output characteristic adjustment through this non-linear adjustment, the adjustment accuracy can be kept within ±2%.

The flow rate signal pulse output conversion circuit 50 converts the flow rate signal Dout in a form of digital signal outputted from the digital processing circuit 41 into the flow rate signal Vout in a form of analog signal and outputs the same.

FIG. 4 shows an example of an output characteristic curve of such flow rate signal Vout in a form of analog signal.

Second Embodiment

Figure 6:
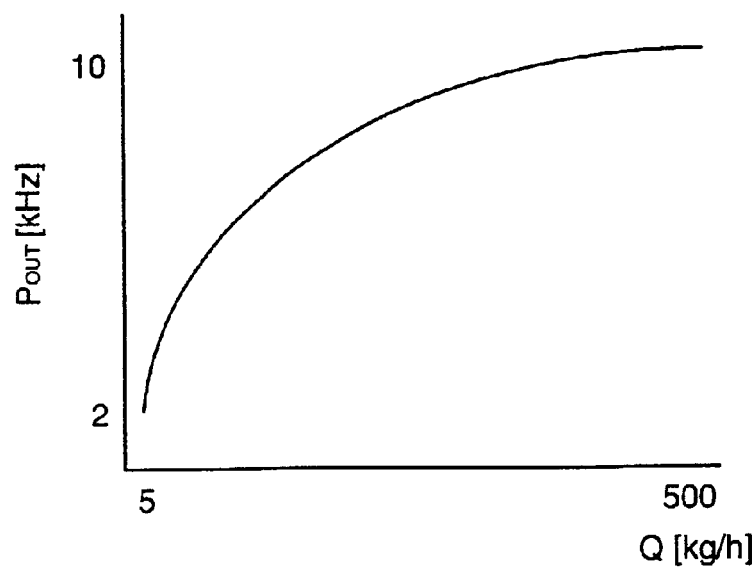
FIG. 6 is a diagram showing an example of flow rate signal output characteristic (air flow rate versus output voltage characteristic) of the gas flow rate measuring device as shown in FIG. 5.
Figure 5:
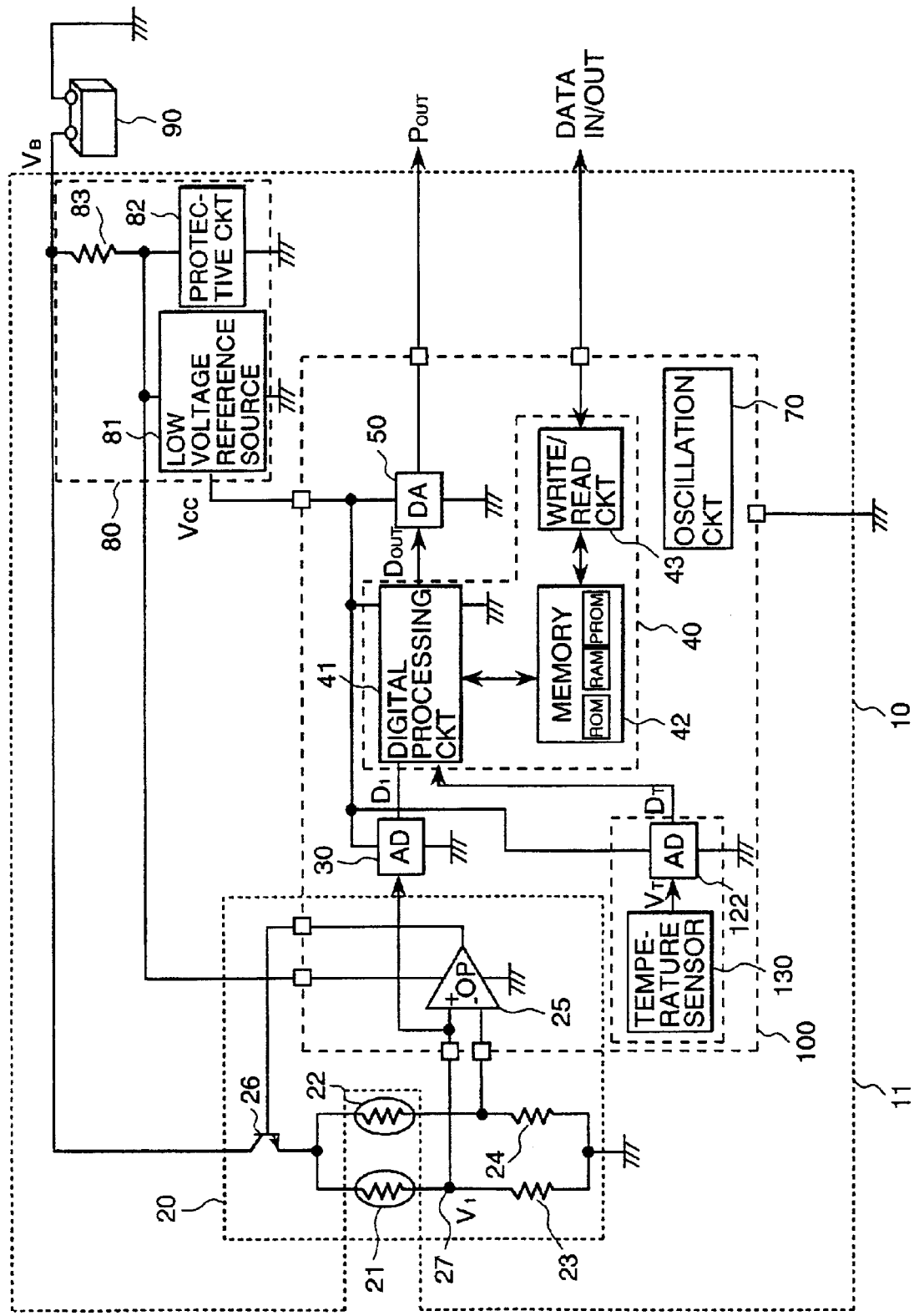
FIG. 5 is a block diagram showing a circuit structure of a gas flow rate measuring device representing a second embodiment of the present invention.

FIG. 5 is a block diagram showing a circuit structure of a gas flow rate measuring device according to the present embodiment and FIG. 6 is a diagram showing an example of an output characteristic of flow rate signal.

The present embodiment is constituted to output the already adjusted flow rate signal according to the first embodiment in a form of pulse train signal (the flow rate is expressed by frequency). Since the other constitutions of the present embodiment are substantially the same as those of the first embodiment, the same reference numerals are assigned thereto and the explanation thereof is omitted.

The flow rate signal pulse train output conversion circuit 110 according to the present embodiment converts the flow rate signal Dout in a form of digital signal outputted from the digital processing circuit 41 into a flow rate signal Pout in a form of pulse train signal having a corresponding frequency and outputs the same.

The clock signal generating circuit 70 uses such as well known CR oscillator and astable multivibrator which is true for all of other embodiments. In such well known circuit a resistance element is used and the resistance of such resistance element varies depending on temperature, thereby, the oscillation frequency thereof is affected by the temperature and varies. Accordingly, a resistor having a small temperature coefficient (TCR) is used for the resistance element. In particular, since the present embodiment is constituted in such a manner that a clock signal (frequency) outputted from the clock signal generating circuit 70 is used as the reference frequency for the pulse train output conversion circuit 110, the clock signal generating circuit 70 is also constituted to be implemented on the semiconductor chip 100 so that an error due to temperature dependency of the clock signal generating circuit 70 is computed by making use of the temperature signal from the chip temperature sensor circuit 60 to perform correction for reducing the error, thereby, the temperature dependent error can be limited.

Third Embodiment

Figure 7:
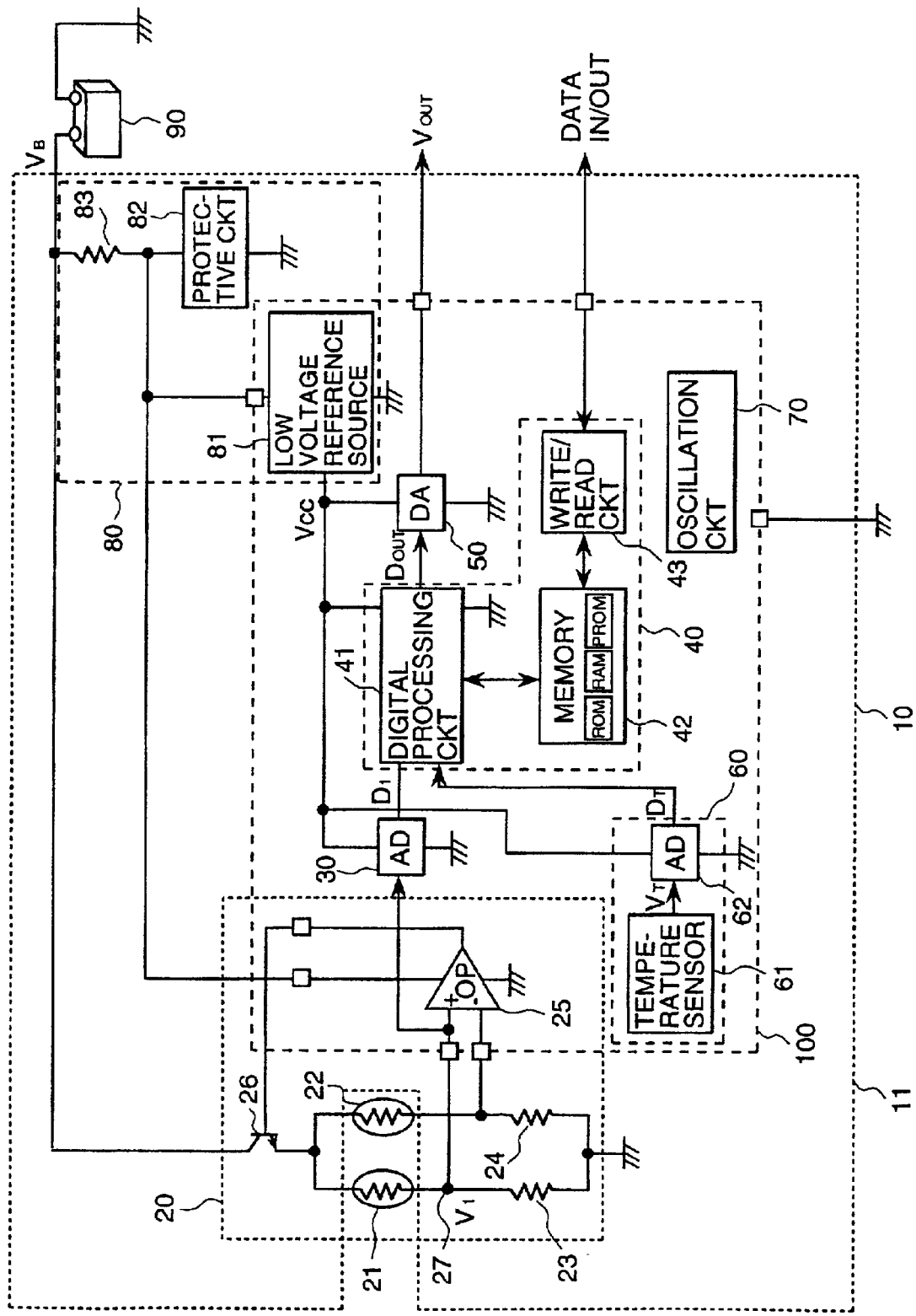
FIG. 7 is a block diagram showing a circuit structure of a gas flow rate measuring device representing a third embodiment of the present invention.
Figure 8:
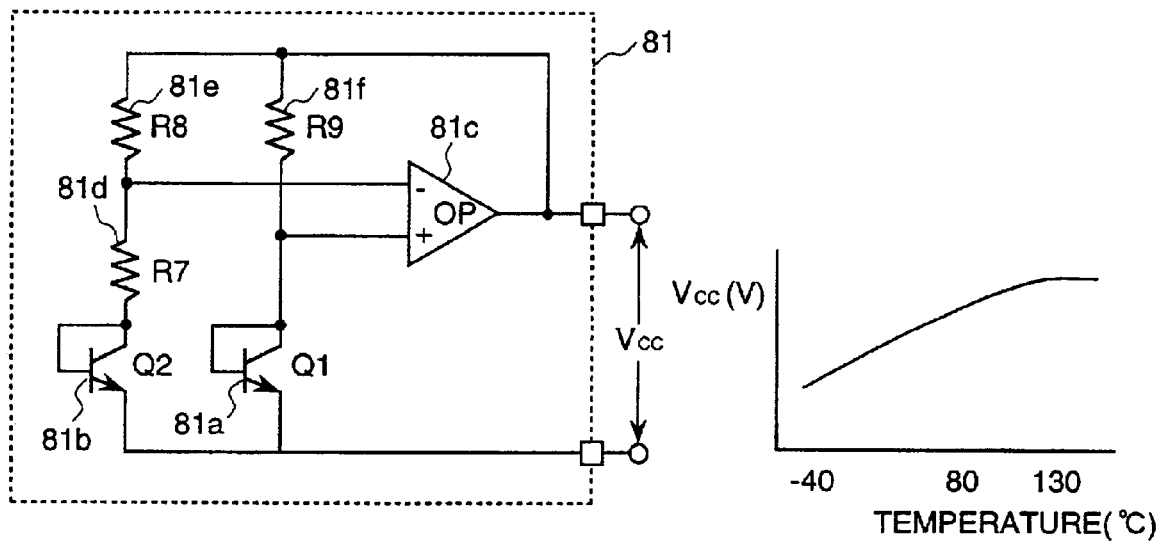
FIG. 8 is a circuit diagram of a constant voltage reference source circuit in the gas flow rate measuring device as shown in FIG. 7 and a characteristic diagram thereof.

FIG. 7 is a block diagram showing a circuit structure of a gas flow rate measuring device according to the present embodiment and FIG. 8 is a circuit diagram of a constant voltage reference power source circuit in the present embodiment and a characteristic diagram thereof. The present embodiment is constituted by implementing the constant voltage reference power source circuit according to the first embodiment on the semiconductor chip by semiconductor integrated circuit technology to form into an integrated circuit. Since the other constitutions of the present embodiment are substantially the same as those of the first embodiment, the same reference numerals are assigned thereto and the explanation thereof is omitted.

A conversion accuracy of the analog-digital conversion circuits 30 and 62 and the flow rate signal pulse output conversion circuit 50 is affected by the reference power source voltage. Since the constant voltage reference power source circuit 81 constituted by using semiconductor circuit elements contains temperature dependency in its output voltage characteristic, therefore, in order to perform correction for reducing the conversion error due to the temperature dependency, the constant voltage reference power source circuit 81 according to the present embodiment is implemented on the semiconductor chip 100 to form a semiconductor integrated circuit as shown in FIG. 7.

The constant voltage reference power source circuit 81 is, for example, realized by a band gap reference power source circuit (or a band gap voltage source circuit). Such constant voltage reference power source circuit 81 is constituted by two diode connected transistors 81a and 81b, an operational amplifier 81c and resistors 81d through 81f. Currents flowing through the transistors 81a and 81b are kept at a predetermined ratio determined by the resistances of the resistors 81e and 81f through the use of the operational amplifier 81c. At this instance when the sum of the base-emitter voltage of the transistor 81b and the voltage drop of the resistor 81d is kept equal to the base-emitter voltage of the transistor 81a, the output of the operational amplifier 81c stabilizes. The voltage drop of the resistor 81d is kept equal to the difference between base-emitter voltages of the transistors 81b and 81a and assumes a value proportional to thermal voltage $V_T=kT/q$, wherein k: Boltzmann constant, T: temperature and q: electric charge amount of electron, therefore, the currents flowing through the resistors 81e and 81f and the transistors 81a and 81b show a positive linear temperature characteristic. Generally, since the base-emitter voltage of a transistor shows a negative temperature characteristic, the reference voltage, in that the output of the band gap reference power source circuit representing the sum of the base-emitter voltages of the transistors 81a and 81*b* and the voltage drop of the resistor 81*d* being proportional to the thermal voltage $V_T$ can be set at a linear temperature coefficient by adjusting resistances of the resistors 81*d* through 81*f*. Actually, since the respective elements included in the band gap reference power source circuit show slight non-linear temperature coefficients, if the output voltage linearity of the reference power source circuit is set desirably at room temperature, a slightly non-linear output voltage due temperature dependency appears at a high temperature side.

This temperature dependency causes the conversion error of the analog-digital conversion circuits 30 and 62 and the flow rate signal pulse output conversion circuit 50 which use the output voltage of the constant voltage reference power source circuit 81 as their reference voltage sources. The temperature dependent error is reduced by an adjustment according to equation (2) above. However, under a transient state with regard to temperature variation such as immediately after the power source has been made and when the intake air temperature has varied, the temperature distribution in the gas flow rate measuring device 10 varies from that in the steady state. Since this variation in temperature distribution can not be corrected according to equation (2) above which performs correction by making use of the output from the temperature sensor circuit in which temperature difference is caused, the output voltage contains an error.

However, in the present embodiment, in order to prevent temperature difference between the chip temperature sensor circuit 60 and the constant voltage reference power source circuit 81, the constant voltage reference power source circuit 81 is disposed on the semiconductor chip 100 together with the chip temperature sensor 60 to form a semiconductor integrated circuit, thereby, a correction for reducing the error due to temperature dependency of the constant voltage power source circuit 81 can be performed.

Fourth Embodiment

Figure 10:
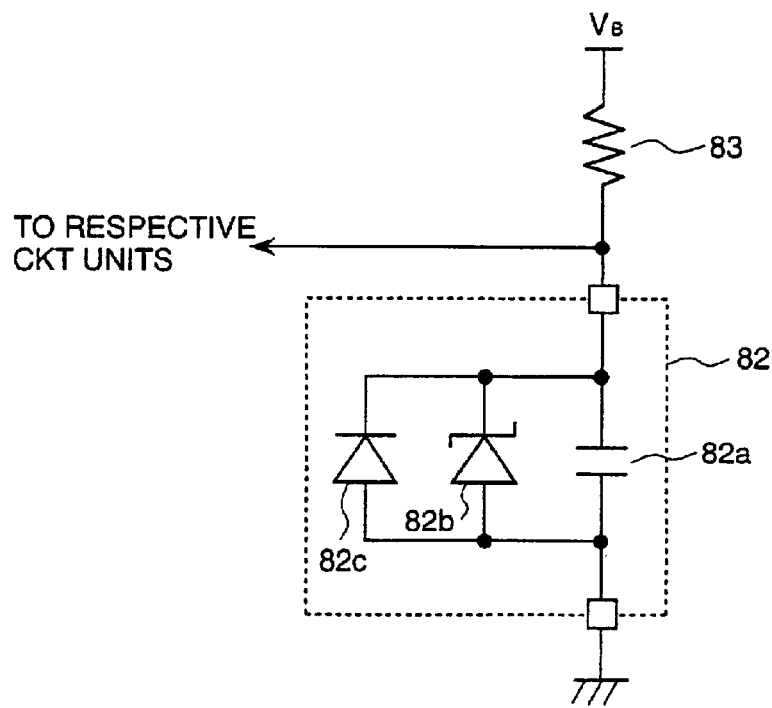
FIG. 10 is a circuit diagram of a protection circuit in the gas flow rate measuring circuit as shown in FIG. 9.
Figure 9:
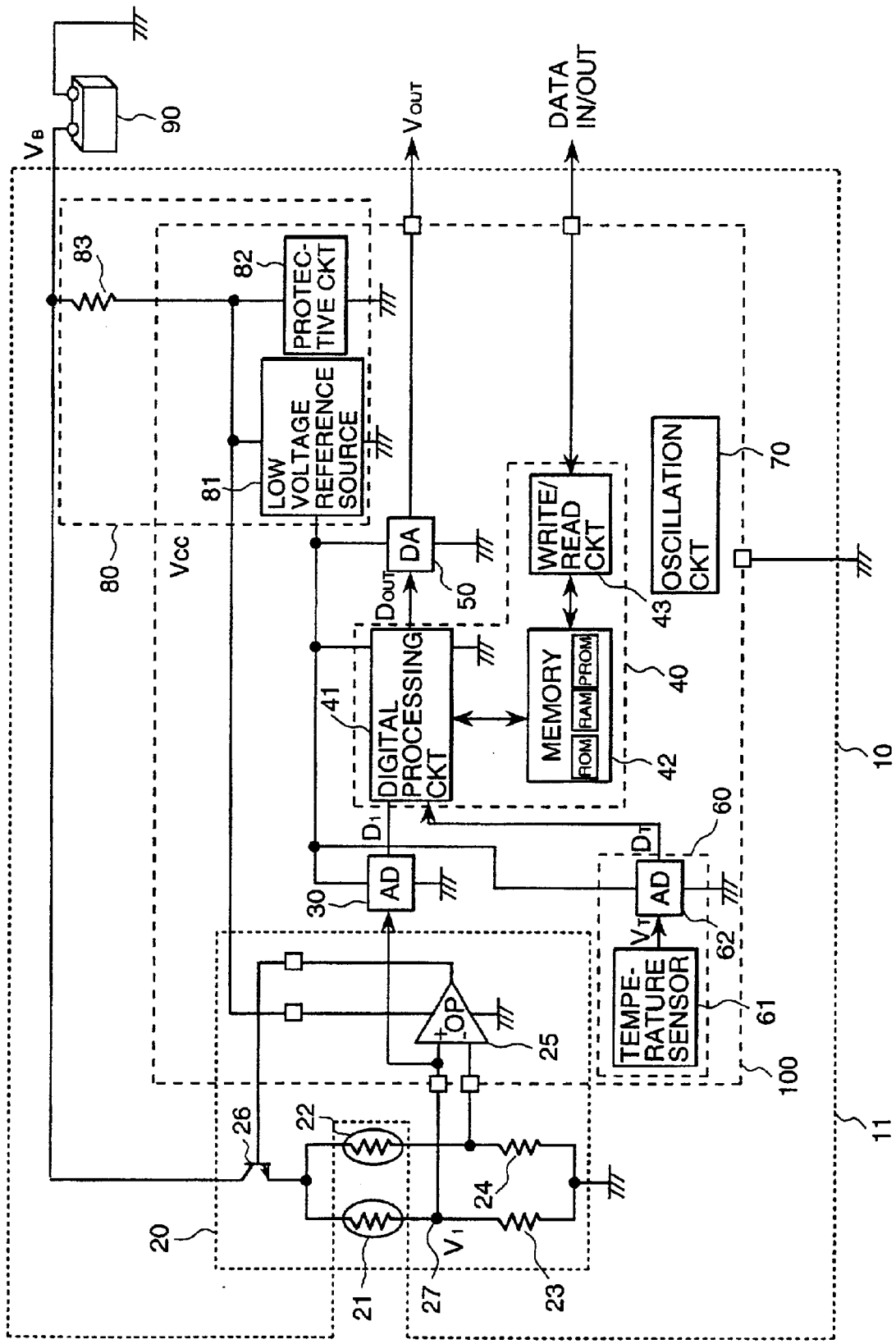
FIG. 9 is a block diagram showing a circuit structure of a gas flow rate measuring device representing a fourth embodiment of the present invention.

FIG. 9 is a block diagram showing a circuit structure of a gas flow rate measuring device according to the present embodiment and FIG. 10 is a circuit diagram of a protection circuit in the present embodiment. The present embodiment is constituted by implementing the protection circuit according to the third embodiment on the semiconductor chip by making use of a semiconductor integrated circuit technology to form an integrated circuit. Since the other constitutions of the present embodiment are substantially the same as those of the third embodiment, the same reference numerals are assigned thereto and the explanation thereof is omitted.

In order to reduce the size of the gas flow rate measuring device 10, it is necessary to reduce the size of the hybrid IC board 11. In order to reduce the size of the hybrid IC board 11, it is desirable to implement many electronic circuits constituting the gas flow rate measuring device 10 on a single semiconductor chip 100 to form an integrated circuit.

In the present embodiment, the protection circuit 82 for protecting the semiconductor chip 100 from surges, overvoltages and high frequency noises is constituted by a capacitor 82*a*, a zener diode 82*b* and a diode 82*c*. The capacitor 82*a* absorbs such as a surge building-up edge having high frequency components and high frequency noises. The zener diode 82*b* functions to short such as a positive surge and overvoltage and to prevent the same flowing into other electronic circuits. However, in order to prevent break down of the zener diode 82*b* by permitting current flow without limitation, the current therethrough is limited by a current limiting resistor 83. Further, the diode 82*c* functions to short a negative surge and to prevent the same flowing into other electronic circuits.

In the present embodiment, since such protection circuit 82 is implemented on the semiconductor chip 100 to form an integrated circuit, the size of the hybrid IC board 11 is reduced, thereby, the size of the gas flow rate measuring device 10 is also reduced. However, with regard to the capacitor 82*a*, since a capacitance of a capacitor which can be implemented on the semiconductor chip 100 is limited, therefore, it is frequently preferable to implement the same external to a semiconductor chip. Further, through combination of a zener diode with such as a bipolar transistor and Dch-MOS a further small sized protection circuit can be constituted.

Now, the respective embodiments as has been explained above are intended to reduce the temperature dependent error of the hybrid IC board 11 and as shown in FIG. 3 the temperature of the hybrid IC board 11 assumes substantially the same temperature as the intake air. Accordingly, in order to reduce the intake air temperature dependent error, if a board temperature characteristic which shows a reverse characteristic with respect to the intake air temperature characteristic is provided, the temperature characteristic (temperature dependent error) of the gas flow rate measuring device 10 as a whole can be limited. Further, in this instance, since under a high flow rate operation region the intake air hits strongly onto the base 12 in the gas flow rate measuring device 10, difference between the intake air temperature and the board temperature is limited, the follow-up characteristic of board temperature variation with respect to the intake air temperature variation is desirable, however, under a low flow rate operation region since the intake air flow rate acting on the base 12 is weaken, the follow-up characteristic of the board temperature variation with respect to the intake air temperature variation is lowered, moreover, since heating such as of the power transistor 26 on the hybrid IC board 11 increases which is not sufficiently cooled by the intake air, a difference between the intake air temperature and the board temperature can be caused. For this reason, under low flow rate operation region both the intake air temperature dependent error and the board temperature dependent error are preferably set near zero, and under the high flow rate operation region the intake air temperature dependency and the board temperature dependency are preferably set to show opposite characteristics each other, thereby, even if a difference between the intake air temperature and the board temperature is caused under a low flow rate operation region, the temperature dependent error of the gas flow rate measuring device 10 itself can be reduced. Further, if an intake air temperature signal obtained from the air temperature measurement use resistor 22 or from a separately implemented intake air temperature sensor is taken in by the digital processing circuit 41 after being subjected to analog-digital conversion, and computation for correction is performed, a correction for reducing the intake air temperature dependent error can be realized.

Further, although the hybrid IC board 11 is constituted to be disposed in the intake air passage 201 of the gas flow passage body 200 as shown in FIG. 3, even if the hybrid IC board 11 is disposed outside the gas flow passage body 200, the correction of reducing the board temperature dependent error can be likely realized.

Further, since the gas flow rate measuring device 10 is implemented on the casing 13 and the casing 13 is attached to the gas flow passage body 200 while protecting into the intake air flow passage 201 in a cantilever state so that the heating resistor 21 and the gas temperature measurement use resistor 22 in the gas flow rate detection circuit 20 are exposed to the gas flowing through the intake air flow passage 201, the vibration of the internal combustion engine is transmitted to the projecting portion to vibrate the same. When the size of the hybrid IC board 11 is reduced, the projecting amount (length) in a cantilever structure of the casing 13 into the intake air flow passage 201 can be limited, thereby, a counter measure to the vibration (vibration resistant structure) can be easily realized. Further, because of small sized casing, reduction of flow resistance within the intake air flow passage can be achieved, thereby, fuel economy for the internal combustion engine can be improved.

In the present invention in which the adjustment is performed for digital signals, a series of signal processing circuits for output characteristic adjustment and a temperature sensor circuit through which temperature information for correcting temperature dependent error of the series of single processing circuits are implemented on a signal semiconductor chip to form an integrated circuit, and an adjustment computation including a correction computation for reducing the temperature dependent error is performed in the series of signal processing circuits, thereby, an output characteristic adjustment with limited temperature dependent error can be performed.

Moreover, the circuits therefor is constituted by being implemented on the single semiconductor chip to form an integrated circuit, a small sized and easy manufactured gas flow rate measuring device can be realized.

Still further, such as even the constant voltage reference power source circuit and the protection circuit are implemented on the single semiconductor chip to form an integrated circuit, a further small sized and easy manufactured gas flow rate measuring device can be realized.

What is claimed is:

1. A gas flow rate measuring device comprising:

a gas flow rate detection circuit which detects current flowing through a resistor disposed in a gas flow passage or voltage induced across the resistor dependent on the current flowing therethrough and outputs a flow rate signal in a form of an analog signal in response to the gas flow rate flowing through the gas flow passage;

a flow rate signal analog-digital conversion circuit which converts the flow rate signal in a form of an analog signal outputted from the gas flow rate detection circuit into an electric signal in a form of digital signal; and an adjustment processing circuit which adjusts the flow rate signal in a form of digital signal so as to assume a desired output characteristic;

wherein the flow rate signal analog-digital conversion circuit and the adjustment processing circuit are integrated on a common semiconductor chip and a chip temperature sensor and a chip temperature signal analog-digital conversion circuit are also integrated on the common semiconductor chip; and wherein a chip temperature signal in a form of analog signal outputted from the chip temperature sensor is converted into a chip temperature signal in a form of digital signal by the chip temperature signal analog-digital conversion circuit and the converted digital chip temperature signal is inputted into the adjustment processing circuit so as to perform correction for reducing a temperature dependent error in a series of signal processing circuits.

2. A gas flow rate measuring device according to claim 1, wherein a flow rate signal digital-analog conversion circuit which converts the flow rate signal in a form of digital signal outputted from the adjustment processing circuit into a flow rate signal in a form of analog signal and outputs the same is further disposed on the semiconductor chip to form the integrated circuit.

3. A gas flow rate measuring device according to claim 2, wherein the chip temperature sensor is provided with a constant current circuit and a diode.

4. A gas flow rate measuring device according to claim 2, wherein the adjustment processing circuit is provided with a recordable memory unit which stores an adjustment coefficient necessary for computation and a writing circuit for writing the adjustment coefficient into the memory unit from an external unit.

5. A gas flow rate measuring device according to claim 2, wherein a constant voltage reference power source circuit is further disposed on the semiconductor chip to form the integrated circuit.

6. A gas flow rate measuring device according to claim 2, wherein a clock signal generating circuit is further disposed on the semiconductor chip to form the integrated circuit.

7. A gas flow rate measuring device according to claim 2, wherein a protection circuit for reducing surges, overvoltages and high frequency noises is further disposed on the semiconductor chip to form the integrated circuit.

8. A gas flow rate measuring device according to claim 2, wherein the semiconductor chip is implemented on a hybrid IC board, the hybrid IC board is attached together with the resistors in the gas flow rate detection circuit to a casing and the casing is attached to a gas flow passage body.

9. A gas flow rate measuring device according to claim 1, wherein a flow rate signal pulse output conversion circuit which converts the flow rate signal in a form of digital signal outputted from the adjustment processing circuit into a flow rate signal in a form of pulse train signal and outputs the same is further disposed on the semiconductor chip to form the integrated circuit.

10. A gas flow rate measuring device according to claim 9, wherein the chip temperature sensor is provided with a constant current circuit and a diode.

11. A gas flow rate measuring device according to claim 9, wherein the adjustment processing circuit is provided with a recordable memory unit which stores an adjustment coefficient necessary for computation and a writing circuit for writing the adjustment coefficient into the memory unit from an external unit.

12. A gas flow rate measuring device according to claim 9, wherein a constant voltage reference power source circuit is further disposed on the semiconductor chip to form the integrated circuit.

13. A gas flow rate measuring device according to claim 9, wherein a clock signal generating circuit is further disposed on the semiconductor chip to form the integrated circuit.

14. A gas flow rate measuring device according to claim 9, wherein a protection circuit for reducing surges, overvoltages and high frequency noises is further disposed on the semiconductor chip to form the integrated circuit.

15. A gas flow rate measuring device according to claim 9, wherein the semiconductor chip is implemented on a hybrid IC board, the hybrid IC board is attached together with the resistors in the gas flow rate detection circuit to a casing and the casing is attached to a gas flow passage body.

16. A gas flow rate measuring device according to claim 1, wherein the chip temperature sensor is provided with a constant current circuit and a diode.

17. A gas flow rate measuring device according to claim 16, wherein the adjustment processing circuit is provided with a recordable memory unit which stores an adjustment coefficient necessary for computation and a writing circuit for writing the adjustment coefficient into the memory unit from an external unit.

18. A gas flow rate measuring device according to claim 17, wherein a constant voltage reference power source circuit is further disposed on the semiconductor chip to form the integrated circuit.

19. A gas flow rate measuring device according to claim 18, wherein a clock signal generating circuit is further disposed on the semiconductor chip to form the integrated circuit.

20. A gas flow rate measuring device according to claim 19, wherein a protection circuit for reducing surges, overvoltages and high frequency noises is further disposed on the semiconductor chip to form the integrated circuit.

21. A gas flow rate measuring device according to claim 20, wherein the semiconductor chip is implemented on a hybrid IC board, the hybrid IC board is attached together with the resistors in the gas flow rate detection circuit to a casing and the casing is attached to a gas flow passage body.

22. A gas flow rate measuring device according to claim 19, wherein the semiconductor chip is implemented on a hybrid IC board, the hybrid IC board is attached together with the resistors in the gas flow rate detection circuit to a casing and the casing is attached to a gas flow passage body.

23. A gas flow rate measuring device according to claim 18, wherein a protection circuit for reducing surges, overvoltages and high frequency noises is further disposed on the semiconductor chip to form the integrated circuit.

24. A gas flow rate measuring device according to claim 18, wherein the semiconductor chip is implemented on a hybrid IC board, the hybrid IC board is attached together with the resistors in the gas flow rate detection circuit to a casing and the casing is attached to a gas flow passage body.

25. A gas flow rate measuring device according to claim 17, wherein a clock signal generating circuit is further disposed on the semiconductor chip to form the integrated circuit.

26. A gas flow rate measuring device according to claim 17, wherein a protection circuit for reducing surges, overvoltages and high frequency noises is further disposed on the semiconductor chip to form the integrated circuit.

27. A gas flow rate measuring device according to claim 17, wherein the semiconductor chip is implemented on a hybrid IC board, the hybrid IC board is attached together with the resistors in the gas flow rate detection circuit to a casing and the casing is attached to a gas flow passage body.

28. A gas flow rate measuring device according to claim 16, wherein a constant voltage reference power source circuit is further disposed on the semiconductor chip to form the integrated circuit.

29. A gas flow rate measuring device according to claim 16, wherein a clock signal generating circuit is further disposed on the semiconductor chip to form the integrated circuit.

30. A gas flow rate measuring device according to claim 16, wherein a protection circuit for reducing surges, overvoltages and high frequency noises is further disposed on the semiconductor chip to form the integrated circuit.

31. A gas flow rate measuring device according to claim 16, wherein the semiconductor chip is implemented on a hybrid IC board, the hybrid IC board is attached together with the resistors in the gas flow rate detection circuit to a casing and the casing is attached to a gas flow passage body.

32. A gas flow rate measuring device according to claim 1, wherein the adjustment processing circuit is provided with a recordable memory unit which stores an adjustment coefficient necessary for computation and a writing circuit for writing the adjustment coefficient into the memory unit from an external unit.

33. A gas flow rate measuring device according to claim 1, wherein a constant voltage reference power source circuit is further disposed on the semiconductor chip to form the integrated circuit.

34. A gas flow rate measuring device according to claim 1, wherein a clock signal generating circuit is further disposed on the semiconductor chip to form the integrated circuit.

35. A gas flow rate measuring device according to claim 1, wherein a protection circuit for reducing surges, overvoltages and high frequency noises is further disposed on the semiconductor chip to form the integrated circuit.

36. A gas flow rate measuring device according to claim 1, wherein the semiconductor chip is implemented on a hybrid IC board, the hybrid IC board is attached together with the resistors in the gas flow rate detection circuit to a casing and the casing is attached to a gas flow passage body.

* * * * *